F. SCHIMMEL.
LOCK NUT.
APPLICATION FILED JUNE 26, 1912.

1,062,039.

Patented May 20, 1913.

WITNESSES
Marie E. McLean
Sauna LeRoy

INVENTOR
Fridolin Schimmel
BY Edw. P. [illegible]
HIS ATTORNEY

UNITED STATES PATENT OFFICE.

FRIDOLIN SCHIMMEL, OF FARIBAULT, MINNESOTA, ASSIGNOR TO SCHIMMEL, REID & COMPANY, OF FARIBAULT, MINNESOTA, A CORPORATION OF MINNESOTA.

LOCK-NUT.

1,062,039.  Specification of Letters Patent.  Patented May 20, 1913.

Application filed June 26, 1912. Serial No. 705,937.

*To all whom it may concern:*

Be it known that I, FRIDOLIN SCHIMMEL, a citizen of the United States, residing in Faribault, county of Rice, State of Minnesota, have invented certain new and useful Improvements in Lock-Nuts, of which the following is a specification.

My invention relates to lock-nuts and more specifically to a lock-nut for a hollow shaft or stud in combination with a grease cup, and has for its object the production of a cheap and durable lock-nut providing means for lubrication of a journal through the shaft or stud on which the nut is attached.

The foregoing and other features of my invention will now be described in connection with the accompanying one sheet of drawings forming part of the specification in which I have represented my lock-nut in its preferred form, after which I shall point out more particularly in the claims, those features which I believe to be new and of my own invention.

Figure 1:
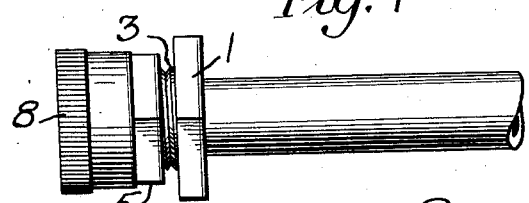
Figure 2:
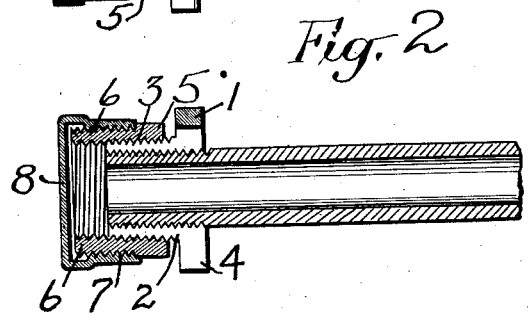
Figure 3:
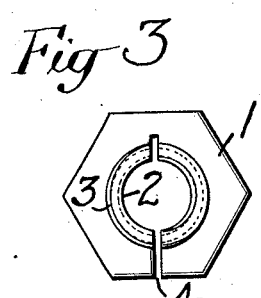
Figure 4:
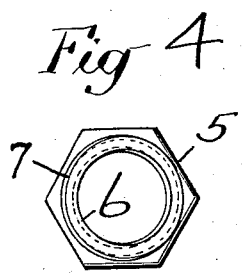
Figure 5:
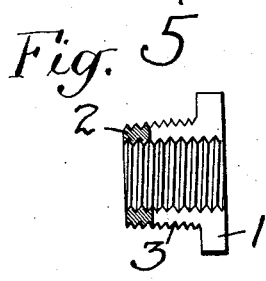
Figure 6:
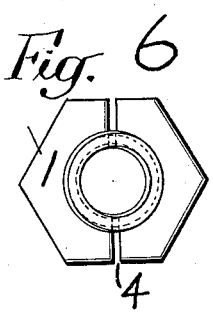

Figure 1 shows my assembled lock-nut on a hollow shaft. Fig. 2 is a section thereof. Fig. 3 is a top view of my main nut showing the saw kerf cut part way the diameter. Fig. 4 is a top view of my auxiliary nut. Figs. 5 and 6 show a modification of my main nut with the saw kerf cut part way the length.

In my invention I employ a hexagon nut 1 provided with an extension 2 having an external tapering thread 3. This nut is cut or slotted as at 4. Adapted to engage the before-mentioned tapering thread 3 I employ a nut 5 which is also provided with an extension 6 having an external thread 7. Adapted to engage this thread is a cap 8. As will be readily understood by referring to Figs. 1 and 2 this combined lock-nut and grease cup readily adapts itself for use on hollow shafts or studs carrying journals which require lubrication. In the use of my invention the nut 1 is screwed home and by tightening the nut 5, due to the tapering thread 3 on shoulder 2 of nut 1, the nut is forced tight against the threads on the shaft and is securely held thereby. Grease or other heavy lubricants may be placed in the hollow formed by the nut 5 and the cap 8 may be filled with grease and screwed up on the threads 7 forcing the grease into the bearing as will be readily understood.

It will be noticed, by referring to Figs. 3, 5, 6, that the saw kerfs employed are somewhat different in that the kerf shown in Fig. 3 is sawed along the axis of the bolt or shaft on which the nut is to be applied, cutting the threaded portion of the nut completely throughout its entire length; whereas the kerf shown in Fig. 6 is sawed perpendicular to the axis of the shaft, cutting diametrically across the hexagon portion of the nut.

I wish it distinctly understood that my lock-nut, herein illustrated and described, is in the form in which I desire to construct it and any changes or modifications may be made without departing from the salient features of my invention and I therefore intend the following claims to cover such modifications as naturally fall within the lines of invention.

I claim:

1. A lock-nut comprising a split nut provided with a shoulder having an external tapered thread, a secondary nut adapted to engage the afore-mentioned thread and provided with a shoulder having an external thread, a cap adapted to engage the latter external thread.

2. A lock-nut for a hollow shaft in combination: a nut provided with an external tapered thread, split part way the length of the nut; a secondary nut adapted to engage said thread provided with an outside thread; a cap adapted to engage the latter external thread, covering the end of the shaft.

This specification signed and witnessed at Faribault, Rice county, State of Minnesota, A. D. 1912.

FRIDOLIN SCHIMMEL.

In the presence of—
ROBERT MEE,
HENRY SCHLATTER.

Copies of this patent may be obtained for five cents each, by addressing the "Commissioner of Patents, Washington, D. C."